(12) United States Patent
Yamada et al.

(10) Patent No.: US 7,797,829 B2
(45) Date of Patent: Sep. 21, 2010

(54) OIL RING, MANUFACTURING METHOD THEREOF, AND PISTON STRUCTURE USING THE OIL RING

(75) Inventors: Masaki Yamada, Niigata-ken (JP); Kuniyasu Ito, Niigata-ken (JP); Masami Kawasaki, Aichi-ken (JP); Tomoaki Abe, Aichi-ken (JP); Shigenobu Uchiyama, Shizuoka-ken (JP)

(73) Assignee: Kabushiki Kaisha Riken, Tokyo (JP)

( * ) Notice: Subject to any disclaimer, the term of this patent is extended or adjusted under 35 U.S.C. 154(b) by 1336 days.

(21) Appl. No.: 11/257,377

(22) Filed: Oct. 24, 2005

(65) Prior Publication Data
US 2006/0081126 A1 Apr. 20, 2006

Related U.S. Application Data
(63) Continuation of application No. PCT/JP2004/005606, filed on Apr. 20, 2004.

(30) Foreign Application Priority Data
Apr. 24, 2003 (JP) .............................. 2003-120169

(51) Int. Cl.
*B23P 15/06* (2006.01)
(52) U.S. Cl. .............................. 29/888.075; 29/888.07; 277/434; 277/435
(58) Field of Classification Search .............. 29/888.07, 29/888.075, 888.3, 464, 450, 452; 277/434, 277/435, 442, 443, 444; 451/51, 246, 254, 451/397, 398, 402
See application file for complete search history.

(56) References Cited

U.S. PATENT DOCUMENTS 1,933,568 A * 11/1933 Six ........................ 29/888.075

(Continued)

FOREIGN PATENT DOCUMENTS

EP 1 092 898 A2 4/2001

(Continued)

OTHER PUBLICATIONS

"Internal Combustion Engines—Small Diameter Piston Rings—Part 12: Coil-Spring-Loaded Oil Control Rings," JIS B 8032-12, 1998, 12 pages, Japan.
"Internal Combustion Engines—Small Diameter Piston Rings—Part 13: Expander/Segment Oil Control Rings," JIS B 8032-13, 1998, 6 pages, Japan.

*Primary Examiner*—David P Bryant
*Assistant Examiner*—Ryan J Walters
(74) *Attorney, Agent, or Firm*—Slater & Matsil, L.L.P.

(57) ABSTRACT

A method of manufacturing an oil ring is disclosed. The oil ring includes an annular oil ring body having a pair of rail portions at its axially upper and lower portions and butt ends, and a coil expander assembled in the inner periphery of the oil ring body. A number of oil ring bodies and annular spacers having a smaller diameter than the oil ring bodies are stacked, and then aligned and retained using a jig such that an outer periphery of the oil ring bodies becomes a circle. The aligned oil ring bodies are rotated and a flat region that is substantially level with respect to the outer peripheral sliding surface of the plurality of oil ring bodies is formed. Curved regions extending on both sides of that flat region are formed using a buff or an elastic grindstone.

17 Claims, 9 Drawing Sheets

U.S. PATENT DOCUMENTS

| | | | | |
|---|---|---|---|---|
| 2,290,321 A | * | 7/1942 | Engelhardt | 277/463 |
| 2,712,971 A | * | 7/1955 | Phillips | 277/444 |
| 2,967,746 A | * | 1/1961 | Braendel | 277/480 |
| 3,435,502 A | * | 4/1969 | Morgan et al. | 29/888.074 |
| 5,966,807 A | * | 10/1999 | Quinney | 29/888.074 |
| 7,077,402 B2 | | 7/2006 | Katumaru et al. | |
| 7,354,045 B2 | * | 4/2008 | Abe et al. | 277/435 |

FOREIGN PATENT DOCUMENTS

| | | |
|---|---|---|
| JP | 1-178274 | 12/1989 |
| JP | 4-95664 | 3/1992 |
| JP | 5-87366 | 4/1993 |
| JP | 2001-108099 | 4/2001 |
| WO | WO 2004/094809 A1 | 11/2004 |

* cited by examiner

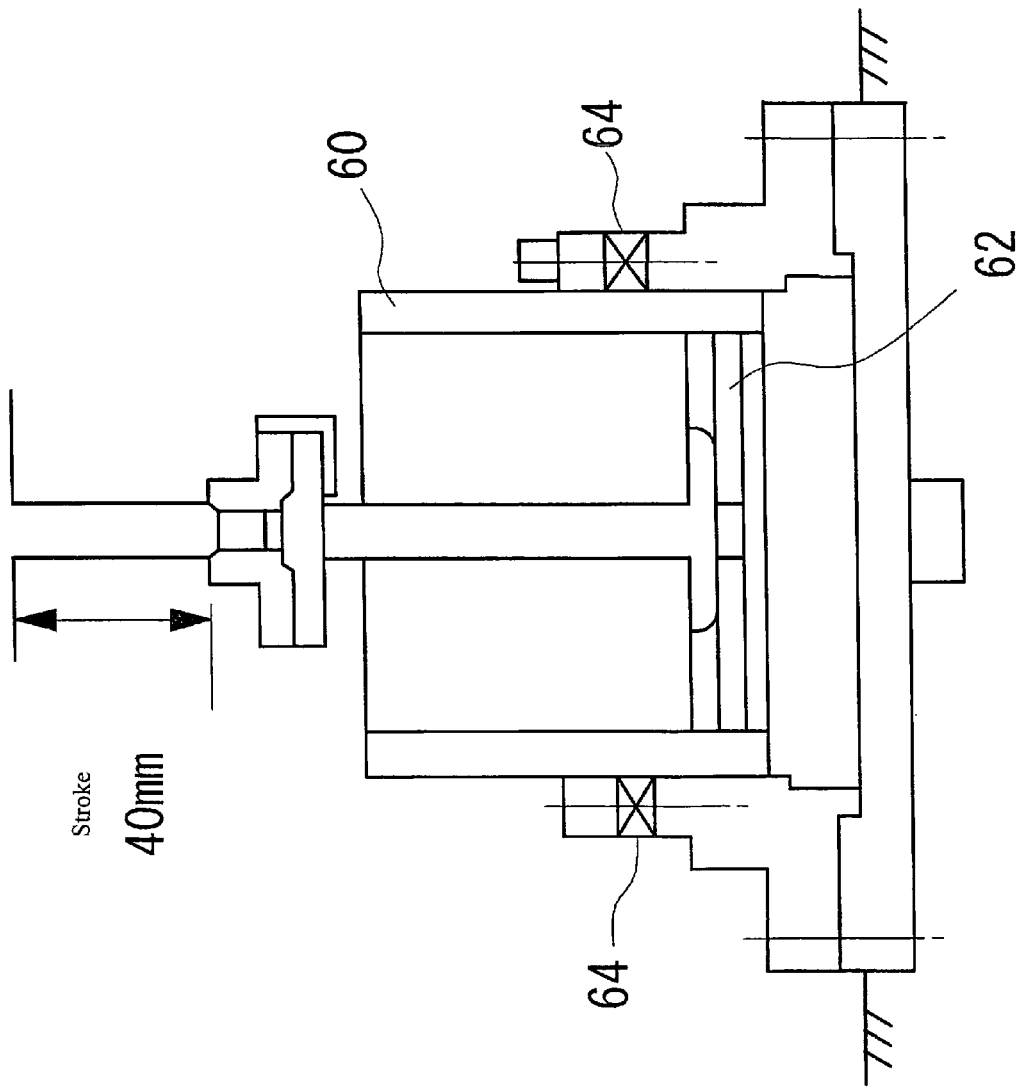

Fig. 7
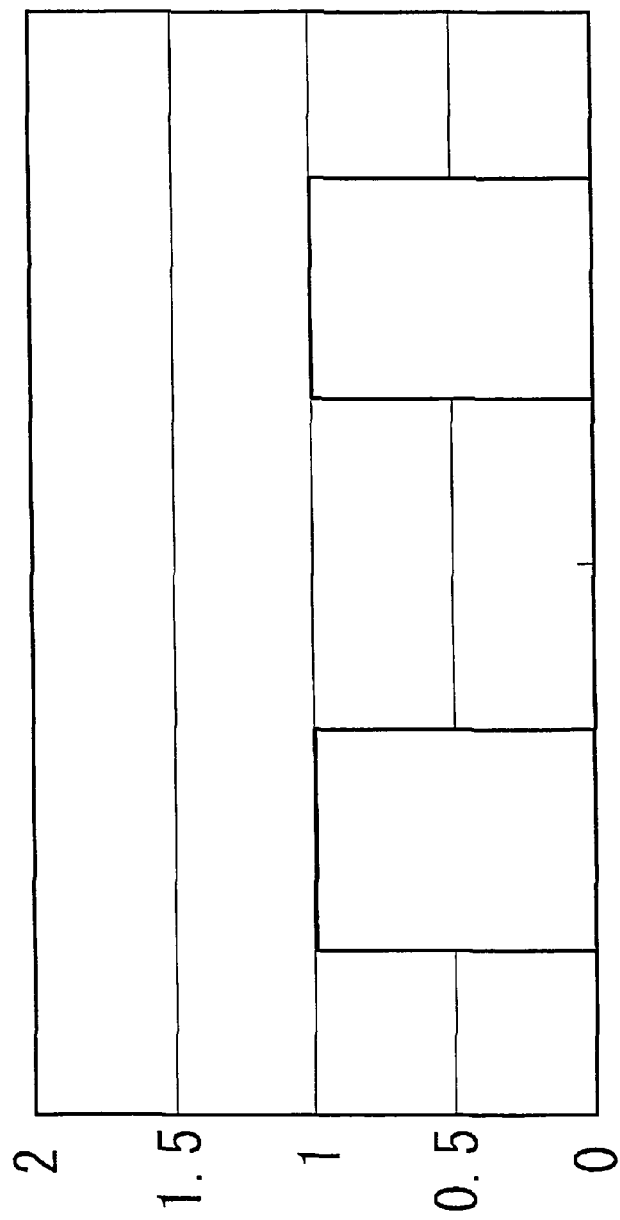
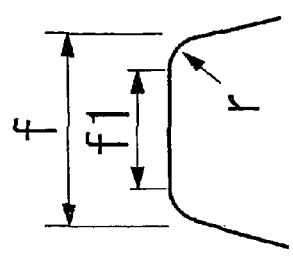
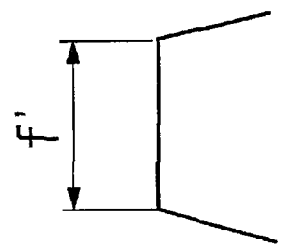

PRIOR ART

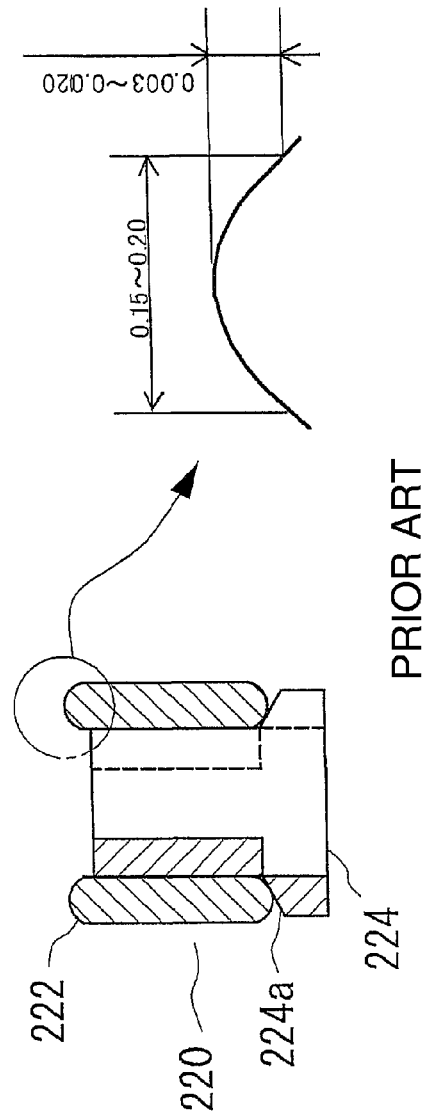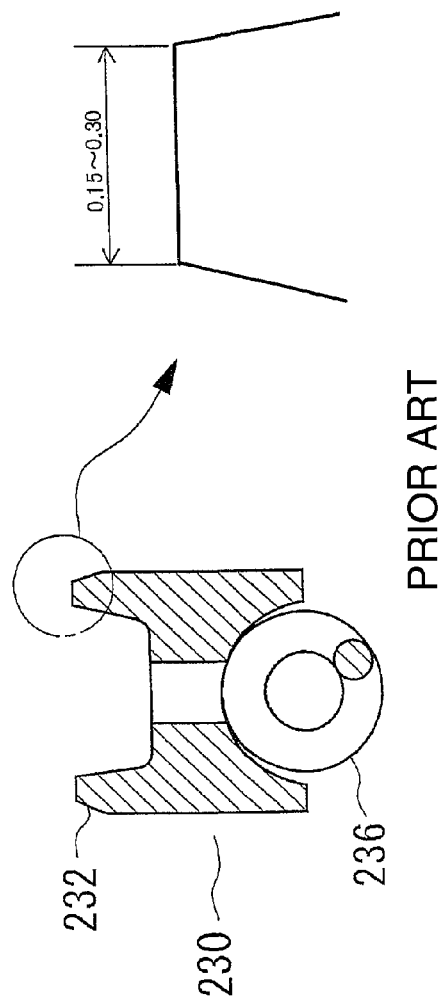

OIL RING, MANUFACTURING METHOD THEREOF, AND PISTON STRUCTURE USING THE OIL RING

This application is a continuation of PCT Application PCT/JP2004/005606, filed on Apr. 20, 2004, which claims the benefit of Japanese Patent Application No. 2003-120169 filed Apr. 24, 2003, which applications are hereby incorporated herein by reference.

TECHNICAL FIELD

This invention relates to an oil ring for use in an internal combustion engine, and more particularly, to the profile of the sliding surface of a two-piece oil ring.

BACKGROUND

As part of efforts to protect global environment, a greater improvement in vehicle fuel efficiency and a cleaner auto-emission have been strongly required. Therefore, friction reduction in internal combustion engine components and reduction in oil consumption have become critical issues. In solving these issues, piston rings play an important role. In designing a piston ring, it has been noted that lowering the tension of the piston ring is effective in reducing friction and that reducing the width of the piston ring is effective in reducing oil consumption. The width reduction is effective in that a smaller section modulus (Z) of a piston ring shows a better compatibility (movement to follow the cylinder wall), and thus improves oil consumption.

FIGS. 8A to 8C show cross sections of a typical piston ring structure in an internal combustion engine. FIG. 8A shows a cross section of a piston structure wherein a three-piece type oil ring is installed. FIG. 8B shows a cross section of a piston structure wherein a two-piece type oil ring is installed. FIG. 8C shows a cross section of a two-piece type oil ring. In a piston 100, ring grooves 110, 120, and 130 for accommodating piston rings are formed. In these ring grooves, two compression rings 200, 210 mainly for gas sealing, and a combined oil ring 220 or 230 mainly for oil controlling and oil sealing are inserted. In accordance with the reciprocating motion of the piston 100, outer peripheral sliding surfaces of these rings slide with the inner wall of a cylinder 300.

The combined oil ring 220 shown in FIG. 8A generally consists of three pieces; two side rails 222 arranged at its axially upper and lower portions, and a spacer-expander 224 assembled therebetween for pressing from inner periphery side of the side rails 222 to produce tension on the side rails 222. The combined oil ring 230 shown in FIGS. 8B and 8C consists of two pieces; an oil ring body 234 having a pair of rail portions 232 arranged at its axially upper and lower portions, and a coil expander 236 assembled in the inner periphery of the oil ring body 234 for pressing the oil ring body 234 to produce tension.

Regarding three-piece type oil rings, profiles of each part of three-piece type oil rings are described, for example, in JIS B 8032-13, "Internal combustion engines—Small diameter piston rings—Part 13: Expander/segment oil control rings," established on Dec. 20, 1998, pages 3 to 5. Regarding two-piece type oil rings, profiles of each part of various kinds of two-piece type oil rings are described, for example, in JIS B 8032-12, "Internal combustion engines—Small diameter piston rings—Part 12: Coil-spring-loaded oil control rings," established on Dec. 20, 1998, pages 2 to 11.

In general, the profile of the sliding surface of the side rails 222 used for a three-piece type is barrel-shape or nearly semicircle as shown in FIG. 9A, and the profile of the sliding surface of the rail portions 232 used for a two-piece type is flat as shown in FIG. 9B (dimensions in the drawings are shown in mm). The reason is generally explained as follows.

Due to the angle of the ear portion 224a of the spacer-expander 224 that presses the side rails 222, the side rails 222 for the three-piece type are pressed with component forces in the radial direction toward the cylinder wall and in the axial direction toward upper and lower surfaces of the ring grooves. Therefore, the side rails 222 provide a good sealing with the cylinder wall and with upper and lower surfaces of the ring grooves. While in the two-piece type, the pressing direction of the coil expander 236 is only in the radial direction, thus the sealing with upper and lower surfaces of ring grooves is not enough. Therefore, oil scraping performance at the sliding surface becomes important, and thus the edge portions of the sliding surface have been made acute angles so that oil does not readily enter and oil films do not become thick.

In addition, the upper and lower side rails 222 of the three-piece type can move independently, and can slide even though they are tilted to the axial direction in the ring groove. Therefore, even if an original sliding surface is made as flat, after a long time operation, the sliding surface wears out and becomes a curved surface, not flat surface, as shown in FIG. 9A. In contrast, the sliding surface of the rail portions 232 of the two-piece type is formed as a part of the oil ring body, and slides almost without tilting during operation, and thus the sliding surface has a flat surface as shown in FIG. 9B.

In the Japanese utility model Laid-Open No. H05 (1993)-87366, the profile of the sliding surface of rail portions of a two-piece oil ring was discussed. It mentioned that, a problem arose if the cross section of the profile was nearly semicircle, because the contact area increased and contact pressure decreased as the sliding surface wore out due to the sliding with the cylinder inner wall. Therefore, in the Laid-Open, a sliding surface having a flat surface was proposed, in which the contact pressure did not vary even if it wore out.

However, according to a recent study that measured and compared sliding friction of gasoline engines regarding a three-piece type oil ring and a two-piece type oil ring under the same tension conditions, it was found that the friction of the two-piece type was greater than that of the three-piece type. In other words, more friction reduction is strongly required for the two-piece type oil ring. Another problem to be noted here is that oil consumption increases if friction is reduced. Therefore, measures should be taken to reduce friction while considering the oil consumption issue.

It is therefore an object of the invention to provide an oil ring having an outstanding capability of reducing friction without increasing oil consumption, in other words, without impairing oil sealing capability.

It is further an object of the invention to provide a two-piece oil ring having an outstanding capability of oil sealing and friction reduction, by improving the outer peripheral sliding surface of rail portions.

It is further an object of the invention to provide a method of manufacturing oil rings which have an outstanding capability of reducing friction without impairing oil sealing capability.

It is further an object of the invention to provide a piston structure using an oil ring which has an outstanding capability of oil sealing and friction reduction.

SUMMARY OF THE INVENTION

The reason why the friction of the two-piece type is greater than that of the three-piece type is because the profile of the side rail sliding surface of the three-piece type is nearly semi-circle that easily forms oil films in sliding against the cylinder, while the profile of the rail portion sliding surface of the two-piece type is flat that does not easily form oil films. Therefore, in the case of the two-piece type, the area in which fluid lubricates during combustion processes of an internal combustion engine becomes smaller (or become fewer) than that of the three-piece type. It is assumed that this increases total friction.

Therefore, the present inventors conducted intensive studies for two-piece type oil rings in order to find suitable profiles of the rail portion sliding surface which easily form oil films. As a result, the inventors found that friction reduction can be improved without impairing oil sealing function by forming minute curved portions at both sides of the rail portion sliding surface.

A two-piece oil ring according to the present invention comprises an annular oil ring body having a pair of rail portions formed at its axially upper and lower portions and butt ends (a cross-sectional cut at one location), and a coil expander assembled in the inner periphery side of the oil ring body. The outer peripheral sliding surface of each of the pair of rail portions comprises a nearly level flat region with a length of equal to or more than 0.05 mm in the center and curved regions extending on both sides of the flat region. Preferably, the flat region constitutes a range of equal to or more than 33% and less than 90% of the outer peripheral sliding surface. In addition, the oil ring according to the present invention comprises an annular oil ring body having a pair of rail portions arranged at its axially upper and lower portions and butt ends, and a coil expander assembled in the inner periphery side of the oil ring body, wherein the cross-sectional profile of the sliding region taken in the radial direction of the outer peripheral sliding surface of each of the rail portions comprises a nearly straight region with a length of equal to or more than 0.05 mm in the center and two curved regions formed on both sides of the nearly straight region. Preferably, the nearly straight region constitutes a range of equal to or more than 33% and less than 90% of the sliding surface. More specifically, the radius of curvature of the curved region that contacts the nearly straight region is equal to or more than 3 mm when the curved region is measured under magnification 200 times in the axial direction and 2000 times in the radial direction.

According to the present invention, both side parts of the outer peripheral sliding surface of the rail portion are made to be curved surfaces. With this structure, oil intake onto the sliding surface is enhanced by the wedging effect, and sliding hydraulic pressure is easily generated even at the oil intake portion because oil films become extremely thin, and therefore, friction can be reduced. The reason why the nearly straight region in the center of the outer peripheral sliding surface should have a length of equal to or more than 0.05 mm is because, if the nearly straight region has a length of less than 0.05 mm, the contact pressure becomes too high and thus friction reduction cannot be obtained. In other words, friction reduction cannot be obtained for the same reason if the nearly straight region is less than 33% of the sliding surface. In addition, if the nearly straight region is equal to or greater than 90% of the sliding surface, the curved regions are too short and thus friction reduction cannot be obtained.

If the radius of curvature of the curved region that contacts the nearly straight region is equal to or more than 3 mm when the curved region is measured or observed under magnification 200 times in the axial direction and 2000 times in the radial direction, friction reduction can be obtained because sliding hydraulic pressure is generated at the oil intake portion. However, if the radius of curvature of the curved region is less than 3 mm, friction reduction cannot be obtained because sliding hydraulic pressure is not easily generated at the oil intake portion. It is preferable that the radius of curvature of the curved region that contacts the nearly straight region be equal to or more than 5 mm.

These are the characteristics of the profile of the curved region when it is measured or observed under magnification 200 times in the axial direction and 2000 times in the radial direction. In another way of explanation, the receding distance M of the curved region with respect to the imaginary straight line L that is drawn by extending the nearly straight region in the direction of the curved region is equal to or shorter than 1.5 micrometers for a distance of equal to or longer than 15 micrometers in the axial direction. If the receding distance M of the curved region exceeds 1.5 micrometers in a range within 15 micrometers in the axial direction, sliding hydraulic pressure is not easily generated at oil intake portion, and thus friction cannot be reduced. It is preferable that the receding distance M of the curved region with respect to the imaginary straight line that is drawn by extending the nearly straight region in the direction of the curved region be equal to or shorter than 5 micrometers for a distance equal to or longer than 50 micrometers in the axial direction.

A method of manufacturing an oil ring according to the present invention comprises the steps as follows. The method comprises the step of alternately stacking a plurality of oil ring bodies and annular spacers having a smaller diameter than the oil ring bodies, and then aligning and retaining them by using a jig such that the outer periphery of the oil ring bodies becomes a circle, and the step of pressing the outer peripheral sliding surface of the plurality of oil ring bodies by an elastic material through a film containing hard particles on its surface while rotating the aligned oil ring bodies to form a flat region that is nearly level with respect to the outer peripheral sliding surface and to form curved regions extending on both sides of the flat region.

Preferably, the elastic material includes a urethane rubber. Also preferably, the hard particles include alumina particles or silicon carbide particles. More preferably, the method comprises the step of moving or oscillating the aligned oil ring bodies in the axial direction.

Another manufacturing method according to the present invention comprises the step of alternately stacking a plurality of oil ring bodies and annular spacers having a smaller diameter than the oil ring bodies, and then aligning and retaining them by using a jig such that the outer periphery of the oil ring bodies becomes a circle, and the step of rotating the aligned oil ring bodies and forming a flat region that is nearly level with respect to the outer peripheral sliding surface of the plurality of oil ring bodies and forming curved regions extending on both sides of the flat region by using a buff or an elastic grindstone.

Preferably, the profile machining of the outer peripheral sliding surface is performed by rotating the buff or elastic grindstone. In addition, the direction of the rotation of the buff or elastic grindstone may be orthogonal to the direction of the rotation of the jig. Alternatively, the direction of the rotation of the buff or elastic grindstone may be in parallel to the direction of the rotation of the jig.

A piston structure according to the present invention comprises an oil ring having above-mentioned characteristics, a piston on which ring grooves are formed for accommodating at least the oil ring, and a cylinder in which a space is formed so that the piston is reciprocated therein.

BRIEF DESCRIPTION OF THE DRAWINGS

FIG. 1A is a general view of a two-piece oil ring. FIG. 1B is an enlarged view of "A" portion which is equally magnified in the axial and radial directions. FIG. 1C is an enlarged view of "A" portion which is magnified 200 times in the axial direction and 2000 times in the radial direction. FIG. 1D is an enlarged view of "B" portion which is equally magnified in the axial and radial directions.

FIG. 2A is a front view and FIG. 2B is a side view.

FIG. 3A shows an example where the rotation axis of the jig that is used for mounting oil ring bodies is orthogonal to the rotation axis of the buff or elastic grindstone. FIG. 3B shows an example where the rotation axis of the jig is in parallel to the rotation axis of the buff or elastic grindstone.

FIG. 4 is a schematic diagram that shows the structure of a sliding friction tester.

FIG. 7 is a graph that shows the results of the oil consumption test when the length of the outer periphery region (f) of the rail portions including curved regions is same as that of the nearly straight region (f') of the conventional rail portions.

FIG. 8A shows the case where the oil ring is a three-piece type. FIG. 8B shows the case where the oil ring is a two-piece type.

FIGS. 9A and 9B show details of the outer peripheral sliding surface of conventional oil rings. FIG. 9A shows the profile of the outer peripheral sliding surface of rail portions of a three-piece type oil ring. FIG. 9B shows the profile of the outer peripheral sliding surface of rail portions of a two-piece type oil ring.

DETAILED DESCRIPTION OF ILLUSTRATIVE EMBODIMENTS

Figure 1A:
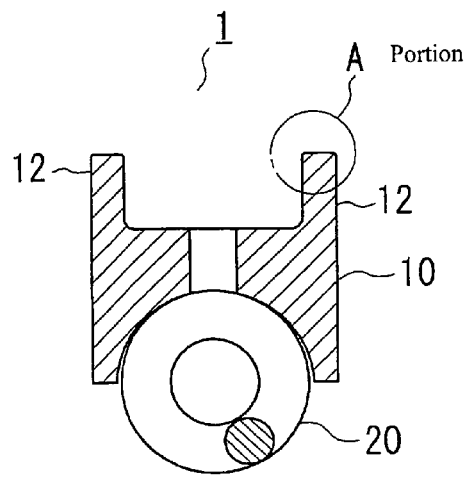
FIGS. 1A to 1D are cross-sectional views of a two-piece oil ring according to the present invention.
Figure 1B:
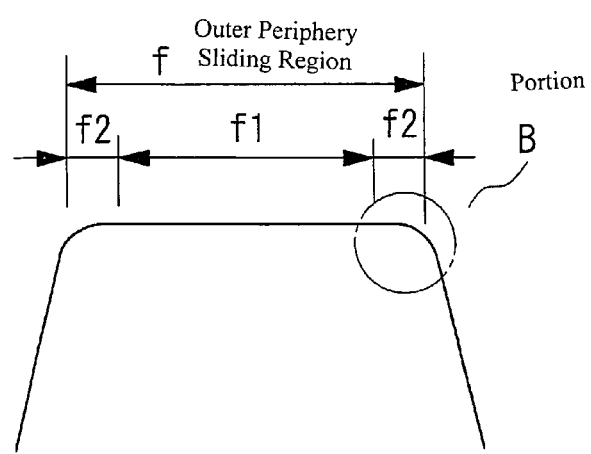
Figure 1C:
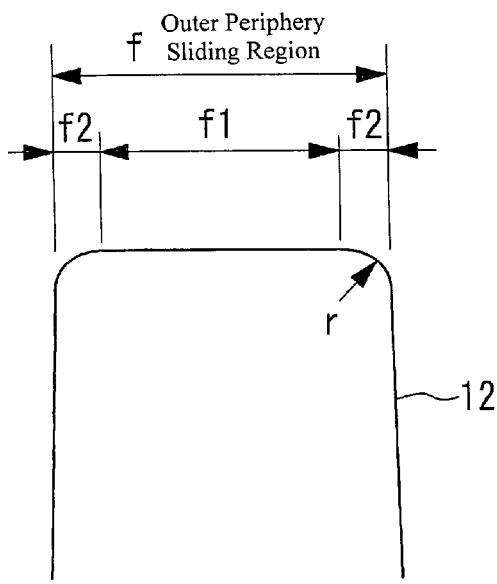
Figure 1D:
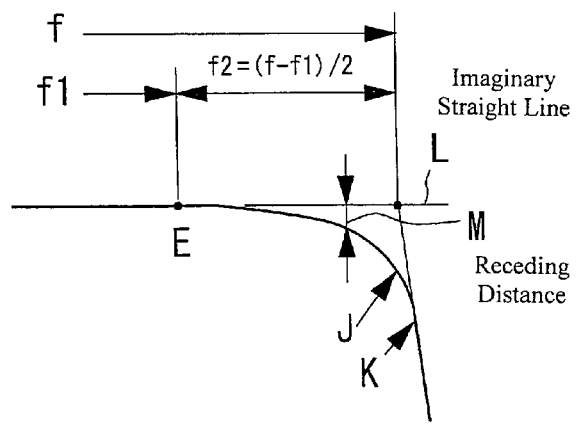

Referring to the attached drawings, embodiments of the present invention are now described. FIGS. 1A to 1D show the outer peripheral sliding surface of a pair of rail portions formed on a two-piece oil ring body according to the present invention, taken in cross section in the radial direction. FIG. 1A is a cross-sectional general view of a two-piece oil ring. FIG. 1B is an enlarged view of "A" portion which is equally magnified in the axial and radial directions. FIG. 1C is an enlarged view of "A" portion which is magnified 200 times in the axial direction and 2000 times in the radial direction. FIG. 1D is an enlarged view of "B" portion which is equally magnified in the axial and radial directions.

An oil ring 1 according to the present invention comprises an oil ring body 10 having a pair of rail portions 12 formed at upper and lower portions in its axial direction and butt ends (not shown), and a coil expander 20 assembled in inner periphery side of the oil ring body 10. In FIGS. 1B, 1C, and 1D, the outer peripheral sliding region of each of the rail portions 12 of the oil ring body 10 is designated by the letter f. The oil ring body 10 of the present invention is characterized in that the outer peripheral sliding region (f) has a nearly straight region (f1) in the center and two curved regions (f2) formed on both sides of the nearly straight region (f1). "B" portion shown in FIG. 1B is a part of the nearly straight region (f1), and a curved region (f2) extending therefrom.

When the curved region (f2) is shown under magnification 200 times in the axial direction and 2000 times in the radial direction by using, for example, a profile measuring device, the radius of curvature r of the curved region (f2) can be relatively easily measured as shown in FIG. 1C. In the present invention, as a way of determining the curved region (f2), the curved region (f2) is determined by the radius of curvature of the curved region under magnification 200 times in the axial direction and 2000 times in the radial direction, wherein the radius of curvature is designated as r. In another determining way, as shown in FIG. 1D, an imaginary straight line L is drawn by extending the straight region (f1) in the direction of the curved region (f2), and the receding distance M of the curved region with respect to the imaginary straight line L is determined by the relation with the axial distance of the curved region (f2), wherein f2=(f−f1)/2. In FIG. 1D, the effective region of the curved region (f2) is the region starting at point E that contacts the nearly straight region (f1) and ending at point J, although there is another region ending at point K that does not appear in FIG. 1C under magnification 200 times in the axial direction and 2000 times in the radial direction. However, the region between the points J and K has little effect on friction reduction because the receding distance M in the region with respect to the imaginary straight line L becomes large.

As mentioned above, by forming a flat region (f1) in the center and curved regions (f2), extending on both sides of the flat region, on the outer peripheral sliding surface (f) of the rail portions 12 of the oil ring body 10, friction with the inner wall of the cylinder can be reduced as mentioned later without increasing oil consumption.

Figure 2B:
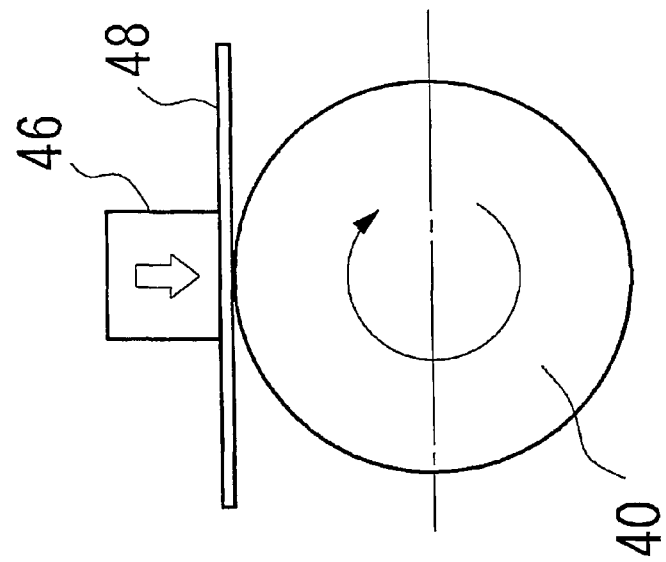
FIGS. 2A and 2B are schematic diagrams to explain the method of grinding the outer periphery of the rail portions of a two-piece oil ring by means of film grinding by using a urethane rubber, according to the first embodiment of the present invention.
Figure 2A:
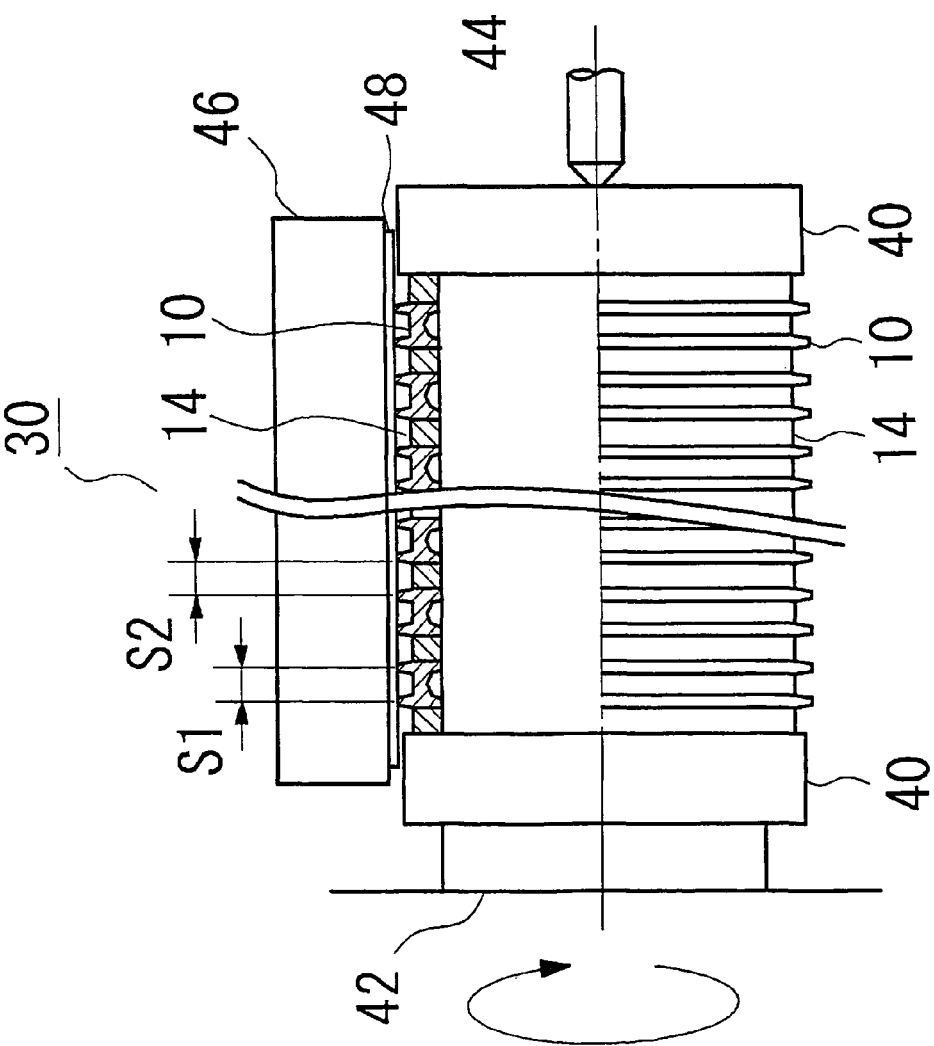

FIGS. 2A and 2B are schematic diagrams to explain the method of manufacturing a two-piece oil ring according to the first embodiment of the present invention. In FIG. 2A, the structure of upper half of the assembled oil ring bodies is shown in cross section. An oil ring machining device 30 has a jig 40, wherein one end of the jig 40 is connected to a rotation device 42 and another end is supported by a bearing 44, and the jig 40 is rotated by the rotation device 42.

A plurality of oil ring bodies 10 and annular spacers 14 (also called distance collars by those skilled in the art), each having a smaller diameter than the oil ring bodies, are alternately stacked on the jig 40, and the butt ends are retained such that the outer periphery of the oil ring bodies 10 becomes a circle. By mounting the oil ring bodies 10 after their outer periphery is aligned as mentioned, the oil ring bodies 10 can be collectively machined. In order to form the curved regions (f2) on both ends of the outer peripheral sliding surface of the rail portions 12, the assembled oil ring bodies 10 are rotated by the rotation device 42, and a film 48 on the surface of which hard particles are distributed is interposed between the assembled oil ring bodies 10 and a urethane rubber 46, and then pressure is applied for grind machining. For the hard particles, alumina or silicon carbide which are generally used as abrasives can be used.

Both of the radius of curvature r of the curved region (f2) under magnification 200 times in the axial direction and 2000 times in the radial direction, and the receding distance M with respect to the imaginary straight line L wherein the axial distance of the curved region (f2) is obtained by the equation, f2=(f−f1)/2, can be controlled appropriately by varying machining time, the grain size of the hard particles, the hardness of the urethane rubber, or the amount of the applied pressure. In addition, by moving the jig 40 to the axial direction and oscillating the assembled oil ring bodies 10, the machining of the outer peripheral sliding surface can be done in a shorter time. In the assembled oil ring bodies 10, by making the distance S1 between the rail portions 12 equal to the width S2 of the spacer 14 (or the distance between the rail portions 12 that straddle a spacer 14), the outer peripheral sliding region of each rail can be machined symmetrically. To the contrary, the outer peripheral sliding region can be machined asymmetrically by changing the width S2 of the annular spacers.

Figure 3A:
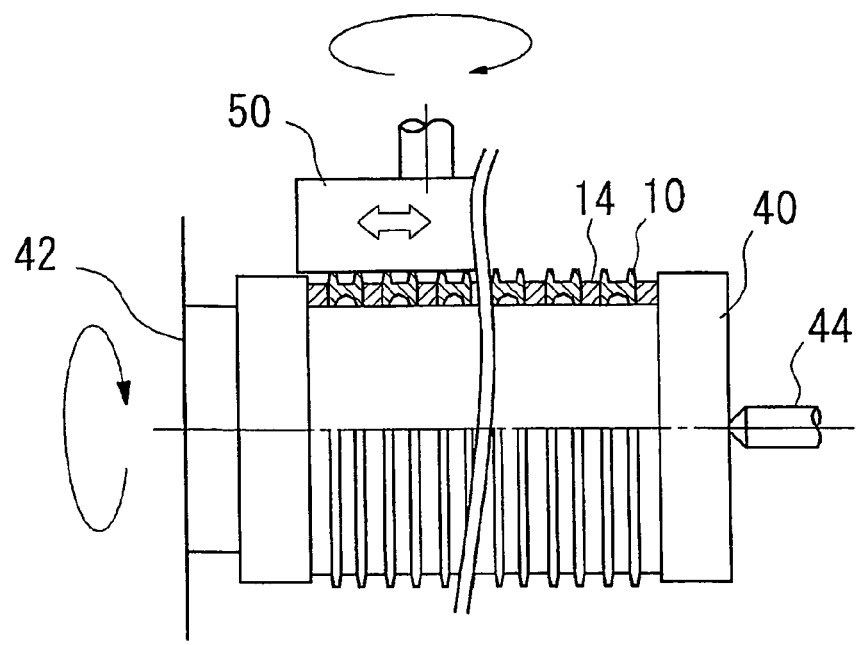
FIGS. 3A and 3B are schematic diagrams to explain the method of grinding the outer periphery of the rail portions of a two-piece oil ring by using a buff or an elastic grindstone, according to the second embodiment of the present invention.
Figure 3B:
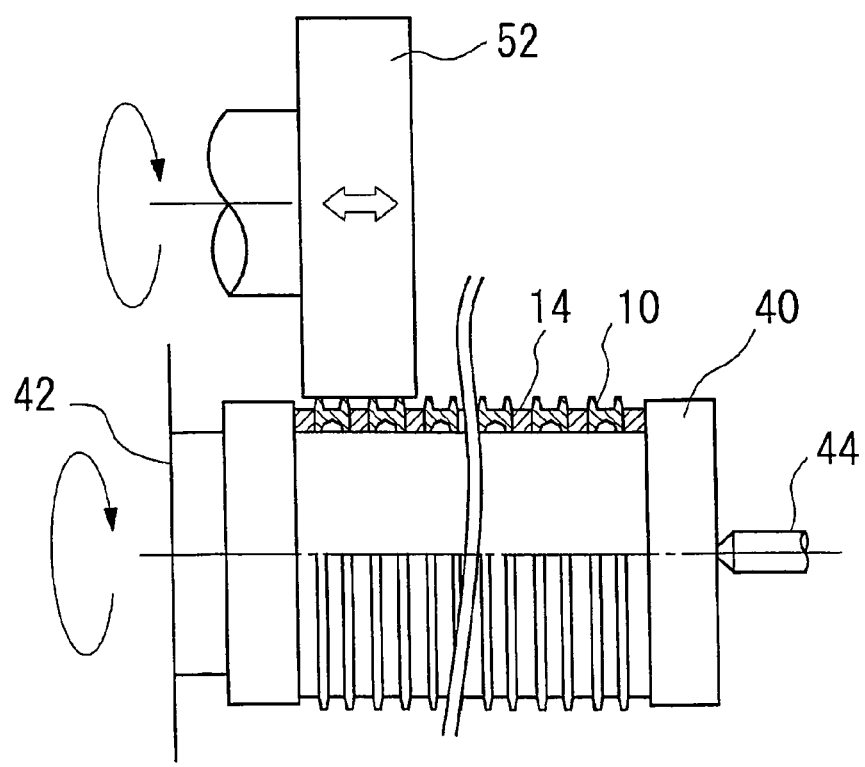

FIGS. 3A and 3B are schematic diagrams to explain the method of manufacturing a two-piece oil ring according to the second embodiment of the present invention, wherein the structure of the upper half of the assembled oil ring bodies is shown in cross section. A machining device according to the present embodiment performs machining by using a buff or an elastic grindstone 50 to form curved regions on both ends of the outer peripheral sliding surface of the rail portions. In the drawings, like parts are identified by the same reference numerals as in FIGS. 2A and 2B. In FIG. 3A, an example is shown where the rotation axis of the buff or elastic grindstone 50 is orthogonal to the rotation axis of the jig 40. In this case, machining can be performed by moving or oscillating the buff or elastic grindstone 50 in the direction of the axis of the jig 40.

In FIG. 3B, an example is shown where the rotation axis of the buff or elastic grindstone 52 is in parallel to the rotation axis of the jig 40. Also in this case, machining can be performed by moving or oscillating the buff or elastic grindstone 52 in the direction of the axis of the jig 40.

Preferred Embodiments

From a wire-rod of martensitic stainless steel having a predetermined profile, two-piece oil ring bodies each having a nominal diameter of 86 mm, a width of 2 mm, and a thickness of 2 mm were formed. On the two-piece oil ring bodies, machining such as outer peripheral lapping, butting end face grinding, and side surface grinding were performed. A plurality of samples were manufactured wherein the width (the length in the axial direction) of the outer peripheral sliding surface of rail portions were made in a range of 0.15 to 0.30 mm.

These two-piece oil ring bodies and annular spacers each having a smaller diameter than the oil ring bodies were stacked alternately, and both ends were retained by using a jig so that the outer periphery of the oil ring bodies became a circle. At that time, the width of the annular spacers was chosen so that the distances between the rails of the assembled oil ring bodies were equal. The assembled oil ring bodies were rotated at 1500 rpm by a rotation device. A film having a width of 50 mm on which alumina particles of #1000 were distributed was interposed between the assembled oil ring bodies and a urethane rubber roller having a Shore hardness of 70 HS, and they were pressed under a load of 100N so that abrasive machining was performed to form curved regions on both ends of the sliding region of the rail portions. At that time, for some samples, oscillating motion with a width of 1 mm per 30 rpm was applied to obtain larger curved regions.

The profiles of the curved regions can be controlled by varying, for example, machining time or contact pressures. The profiles of the curved regions of the samples were classified into three groups according to the radius of curvature of the curved region under magnification 200 times in the axial direction and 2000 times in the radial direction. The three groups were; the profiles whose radius of curvature r were equal to or less than 2 mm (samples for comparison), 3 to 4 mm, and 5 to 9 mm (samples of the embodiments). The radius of curvature of 3 mm corresponds to 15 micrometers in the axial direction and 1.5 micrometers in the radial direction. Similarly, the radius of curvature of 5 mm corresponds to 50 micrometers in the axial direction and 5 micrometers in the radial direction. In addition, the samples whose sliding region of rail portions had only nearly straight region were also manufactured as samples of conventional approach for comparison.

Sliding Friction Test

The evaluation of sliding friction for the above-mentioned various profiles of sliding region of rail portions was performed by using a sliding friction tester. The test was performed with a single model in which only an oil ring was installed in a piston which was reciprocated in a cylinder. FIG. 4 shows a cross-sectional schematic view of the tester. The tester was a single cylinder having a bore diameter of 86 mm and a stroke of 40 mm. A piston 62 was reciprocated in a cylinder 60 whose upper part is opened, with no pressure being applied. Sliding friction was detected by three piezo type washer load sensors 64. Sliding friction was evaluated by the Friction Mean Effective Pressure (FMEP). The Friction Mean Effective Pressure is expressed as pressure and calculated by dividing the integral of the friction during the reciprocating motion in two rotations by the piston displacement. The operation was conducted at 600 rpm under the condition where adequate amount of low viscosity oil as a lubricant was dropped from above the cylinder, wherein the low viscosity oil was at a level of 6 centistokes at 30 degrees centigrade, and the bore temperature in the stroke center portion was controlled at 30 degrees centigrade.

Figure 5:
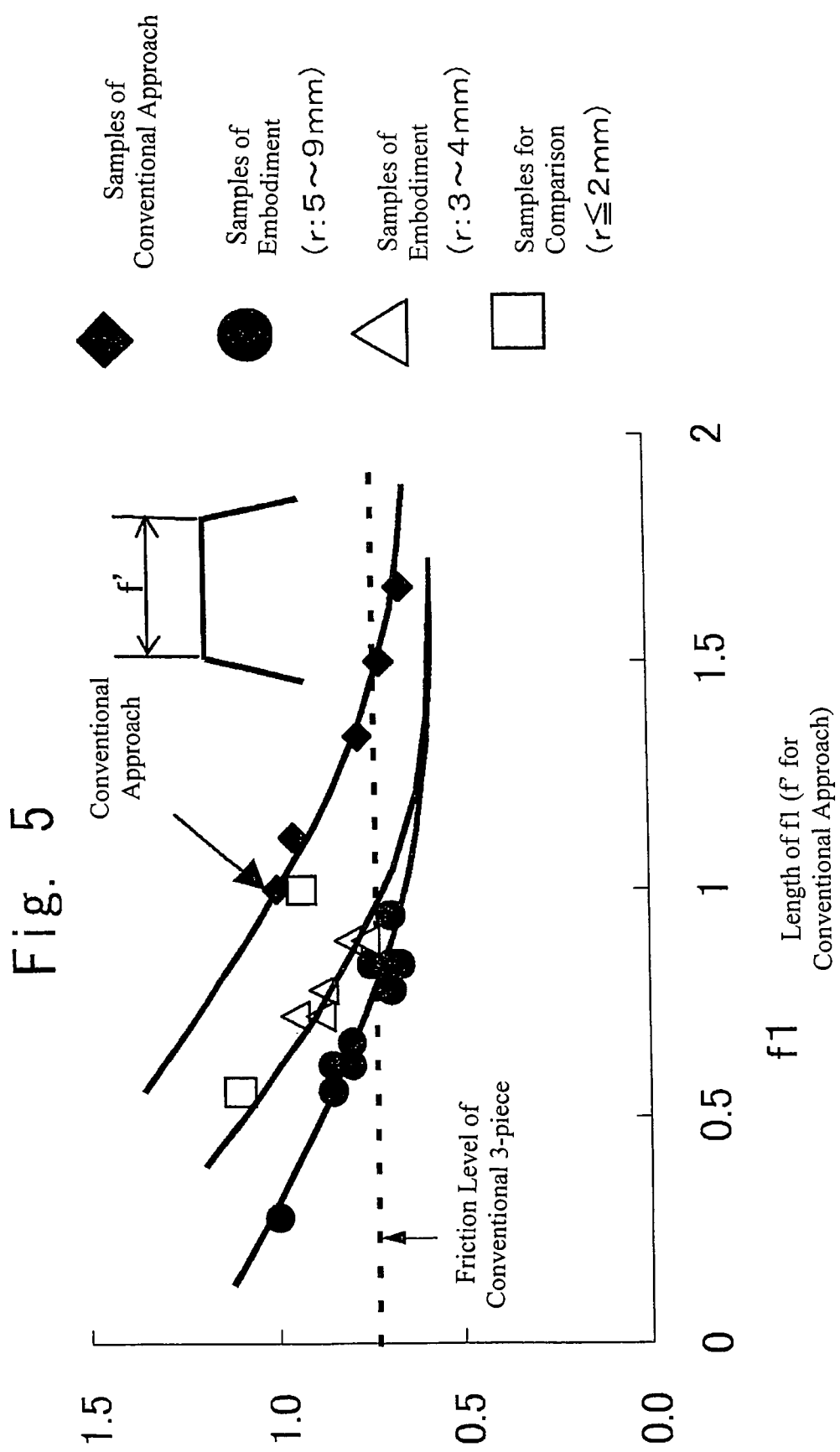
FIG. 5 is a graph that shows the results of the sliding friction test, showing the relationship between the length of the nearly straight region (f1 or f') of the outer periphery region of the rail portion and the friction mean effective pressure, under the same tension condition.

FIG. 5 is a graph that shows the results of the above-mentioned sliding friction test under the same tension condition, and shows the relationship between the length of the nearly straight region (f1) of the outer peripheral sliding region of the rail portion and the Friction Mean Effective Pressure thereof. Also shown in the graph are the results for the samples of conventional approach whose outer peripheral sliding region of the rail portion have only the nearly straight region (f') and do not have curved regions, wherein (f') is shown on the horizontal axis as in the case with (f1). In the graph, the length of the nearly straight region (f1) and the value of the Friction Mean Effective Pressure of the sliding region of a typical rail portion of conventional approach are each defined as 1, and relative values are shown. In addition, the Friction Mean Effective Pressure of 0.73 of a typical three-piece type oil ring under the same tension is also shown by a dashed line.

As is evident from the graph, it is shown also by the sliding friction test that the friction of the two-piece type is higher than that of the three-piece type. Also shown in the graph is that even with the profile whose outer peripheral sliding region of the rail portion has only the nearly straight region (f') and does not have curved regions, the friction can be reduced down to a similar level to that of the three-piece type, by enlarging the sliding region (f'). It can be considered that this is because if the sliding region (f') becomes larger, the contact pressure of the sliding surface reduces, which increases oil film thickness. However, it can adversely increase oil consumption.

According to the present invention, regarding the samples whose radius of curvature of the curved region r are 3 to 4 mm and 5 to 9 mm (samples of the embodiments) under magnification 200 times in the axial direction and 2000 times in the radial direction, it was observed that the friction was decreased when the length of the nearly straight region (f1) was longer than 0.05 mm even if the length of the nearly straight region (f1) was smaller than that of conventional approach, which is defined as 1. It can be considered that this is because sliding hydraulic pressure was generated in the curved regions of the present invention that behave as oil intake portions. Regarding the samples whose radius of curvature of the curved region were equal to or less than 2 mm (samples for comparison) under magnification 200 times in the axial direction and 2000 times in the radial direction, the friction was almost unchanged when the length of the nearly straight region (f1) was same as that of conventional approach, and the friction became greater when the nearly straight region (f1) was shorter than conventional approach.

Figure 6:
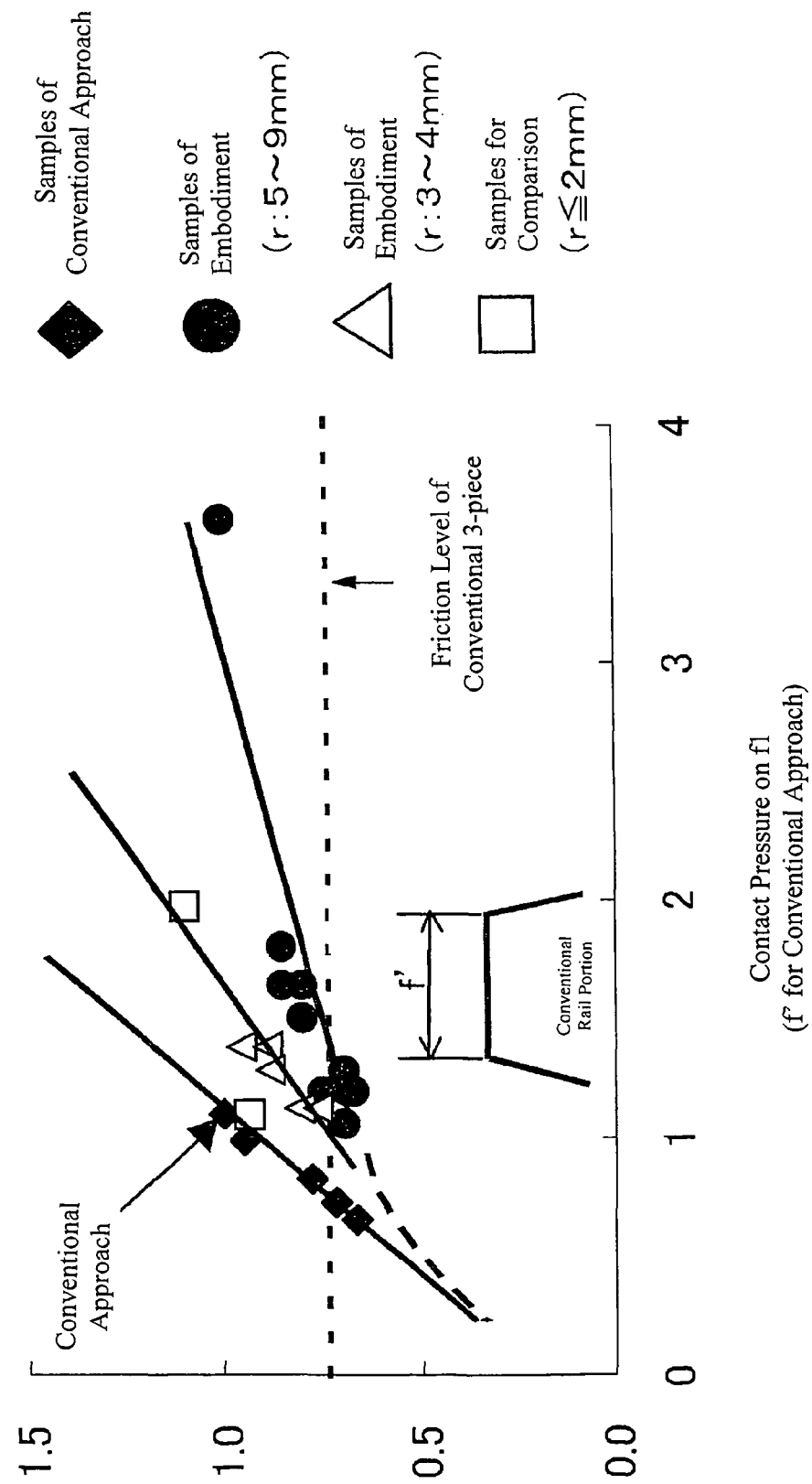
FIG. 6 is a graph that shows the results of the sliding friction test, showing the relationship between the contact pressure on the nearly straight region (f1 or f') of the outer periphery region of the rail portion and the friction mean effective pressure, under the same tension condition.
Figure 8A:
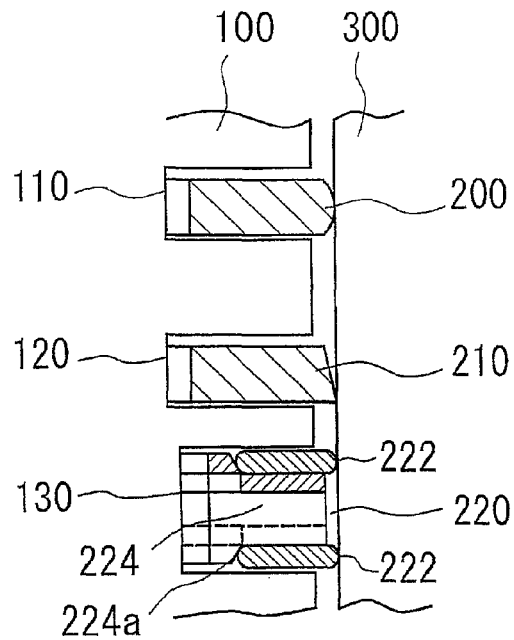
FIGS. 8A and 8B are cross-sectional views of a piston in a cylinder, wherein conventional piston rings are mounted on the piston.
Figure 8B:
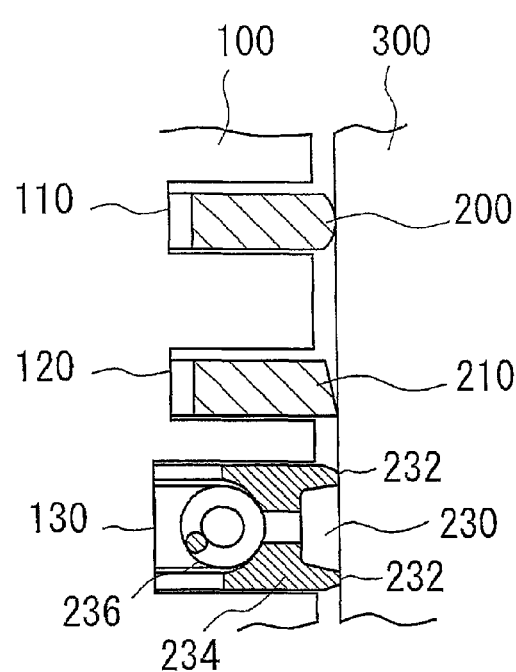
Figure 8C:
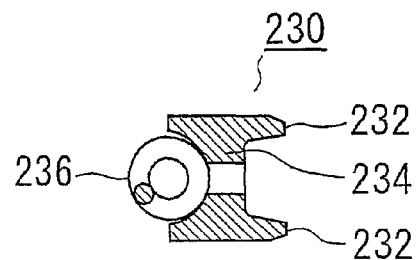
FIG. 8C shows a cross section of the outer peripheral sliding surface of the rail portions of a two-piece type oil ring.

FIG. 6 is a graph that shows the relationship between the contact pressure applied on the nearly straight regions (f1 or f') on the horizontal axis and the Friction Mean Effective Pressure, based on the data shown in FIG. 5. As shown in the graph, regarding the samples whose radius of curvature r of the curved region were 3 to 4 mm and 5 to 9 mm (samples of the embodiments) under magnification 200 times in the axial direction and 2000 times in the radial direction, it can be seen that the friction was reduced even if the contact pressure was greater than the sample of conventional approach whose contact pressure is defined as 1.0.

Oil Consumption Test

To assess oil sealing function of a two-piece oil ring according to the present invention, oil consumption test was conducted by using a 2.5-liter gasoline engine. FIG. 7 shows typical test results under a driving condition that is equivalent to the driving at 100 km/h. In the case of the two-piece oil ring according to the present invention, if the length of outer peripheral sliding region (f) of the rail portions that includes curved regions was same as that of the nearly straight region (f') of conventional approach, oil consumption under the same tension condition was equivalent to that of the conventional approach. It can be assumed that the reason why the equivalent oil consumption was obtained was because, by providing the sliding region of the rail portions which comprises a nearly straight region (f1) in the center and curved regions (f2) on both sides of the straight region, the influence of increasing oil consumption due to the enhancement of oil introduction at the curved regions was cancelled by the influence of reducing oil consumption that is caused because contact pressure of the nearly straight region in the center became higher.

As described above, according to the present invention, by making the outer peripheral sliding region of the rail portions of an oil ring body such that the outer peripheral sliding region comprises a nearly straight region with a length equal to or more than 0.05 mm in the center, when viewed from the cross section of its radial direction, and two curved regions on both sides of the straight region, oil intake onto the sliding surface is enhanced by the wedging effect, and sliding hydraulic pressure is easily generated even at the oil intake portions because oil films become extremely thin. As a result, friction can be reduced. In addition, if the sliding region is not greater than that of the conventional approach, the influence of increasing oil consumption due to the enhancement of oil introduction at the curved regions is cancelled by the influence of reducing oil consumption that is caused because the contact pressure of the nearly straight region in the center becomes higher, and thus friction can be reduced without increasing oil consumption.

What is claimed is:

1. A method of manufacturing an oil ring which comprises an annular oil ring body having a pair of rail portions formed at its axially upper and lower portions and butt ends, the pair of rail portions each having an outer peripheral sliding surface, and a coil expander assembled in an inner periphery of said oil ring body, the method comprising the steps of:

alternately stacking a plurality of oil ring bodies and annular spacers having a smaller diameter than said oil ring bodies, and then aligning and retaining them by using a jig such that an outer periphery of said oil ring bodies becomes a cylinder; and rotating the aligned oil ring bodies, and forming a flat region that is substantially level with respect to said outer peripheral sliding surface of the plurality of oil ring bodies and forming curved regions extending on both sides of said flat region by using a buff or an elastic grindstone.

2. The method according to claim 1, wherein said flat region constitutes a range of equal to or more than 33% and less than 90% of said outer peripheral sliding surface.

3. The method according to claim 1, wherein a radius of curvature of each of said curved regions is equal to or more than 3 mm when said curved regions are measured under magnification 200 times in an axial direction and 2000 times in a radial direction.

4. The method according to claim 1, wherein a radius of curvature of each of said curved regions is equal to or more than 5 mm when said curved regions are measured under magnification 200 times in an axial direction and 2000 times in a radial direction.

5. The method according to claim 1, wherein a receding distance M of each of said curved regions with respect to an imaginary straight line L drawn by extending the flat region in a direction of said curved region is equal to or shorter than 1.5 micrometers for a distance equal to or longer than 15 micrometers in an axial direction of said oil ring body.

6. The method according to claim 1, wherein a receding distance M of each of said curved regions with respect to an imaginary straight line L drawn by extending the flat region in a direction of said curved region is equal to or shorter than 5 micrometers for a distance equal to or longer than 50 micrometers in an axial direction of said oil ring body.

7. The method according to claim 1, wherein said oil ring is a two-piece oil ring.

8. The method according to claim 1, wherein profile machining of said outer peripheral sliding surface is performed by rotating said buff or elastic grindstone.

9. The method according to claim 8, wherein a direction of the rotation of said buff or elastic grindstone is orthogonal to a direction of the rotation of said jig.

10. The method according to claim 8, wherein a direction of the rotation of said buff or elastic grindstone is in parallel to a direction of the rotation of said jig.

11. The method according to 1, wherein the flat region of the outer peripheral sliding surface has a length equal to or more than 0.05 mm.

12. A method of manufacturing an oil ring which comprises an annular oil ring body having a pair of rail portions formed at its axially upper and lower portions and butt ends, the pair of rail portions each having an outer peripheral sliding surface, and a coil expander assembled in an inner periphery of said oil ring body, the method comprising the steps of:

alternately stacking a plurality of oil ring bodies and annular spacers having a smaller diameter than said oil ring bodies, and then aligning and retaining them by using a jig such that an outer periphery of said oil ring bodies becomes a cylinder; and rotating the aligned oil ring bodies, and forming a flat region that is substantially level with respect to said outer peripheral sliding surface of the plurality of oil ring bodies and forming curved regions extending on both sides of said flat region wherein forming the flat region and the curved regions comprises pressing the outer peripheral sliding surfaces of said plurality of oil ring bodies with an elastic material through a film having hard particles.

13. The method according to claim 12, wherein said elastic material includes a urethane rubber.

14. The method according to claim 12, wherein said hard particles include alumina particles or silicon carbide particles.

15. The method according to claim 12, wherein said method further comprises the step of moving or oscillating said aligned oil ring bodies in an axial direction.

16. The method according to claim 12, wherein a radius of curvature of each of said curved regions is equal to or more than 5 mm when said curved regions are measured under magnification 200 times in an axial direction and 2000 times in a radial direction.

17. The method according to claim 12, wherein a receding distance M of each of said curved regions with respect to an imaginary straight line L drawn by extending the flat region in a direction of said curved region is equal to or shorter than 5 micrometers for a distance equal to or longer than 50 micrometers in an axial direction of said oil ring body.

* * * * *